(No Model.)
C. DANIELOWSKY.
MEDICINE SPOON.
No. 427,254.          Patented May 6, 1890.
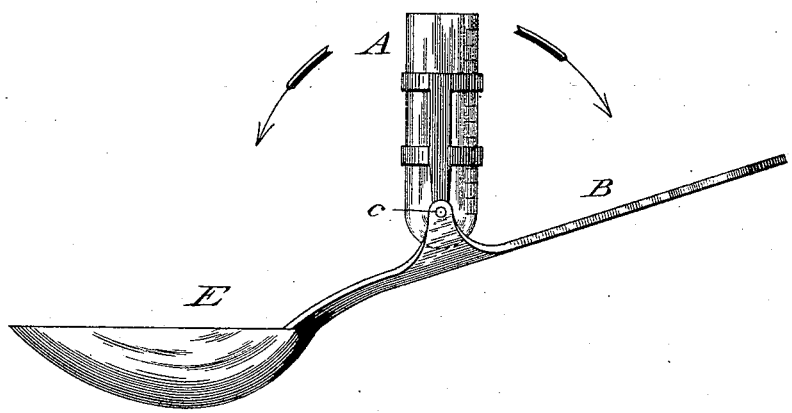
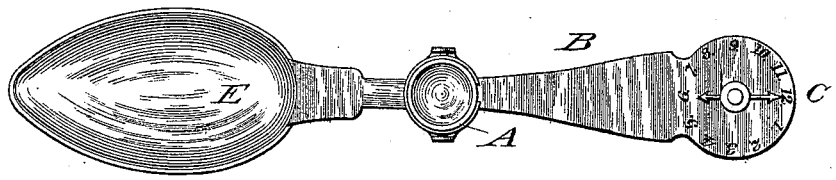
Witnesses:
Emil Trensky
Paul Müller.
Inventor:
Carl Danielowsky
by Andriessen & Normann,
Attorneys.

UNITED STATES PATENT OFFICE.

CARL DANIELOWSKY, OF BRESLAU, PRUSSIA, GERMANY.

MEDICINE-SPOON.

SPECIFICATION forming part of Letters Patent No. 427,254, dated May 6, 1890.

Application filed February 18, 1889. Serial No. 300,383. (No model.)

*To all whom it may concern:*

Be it known that I, CARL DANIELOWSKY, a subject of the King of Prussia and of the German Emperor, and residing at Breslau, in the German Empire, have invented a Spoon for Giving Medicine, of which the following is a specification.

My invention relates to improvements in spoons for giving medicine, having a measuring-scale.

In the annexed drawings is shown in Figure 1 a side view, and in Fig. 2 a top view, of a spoon for giving medicine, which is so arranged as to permit the administering of a determined quantity of medicine, &c., independently of the capacity of the basin of the spoon.

On the spoon-handle B is arranged, movable by means of a hinge-joint c, a small glass A, which may be made of the exact capacity of a tea-spoon or a table-spoon, and is provided with a measuring-scale. The glass, after being filled with the determined quantity of the medicine, will be turned over in the direction of the basin E of the spoon, so that the contents of the glass will flow into this spoon-basin, and the medicine then may be given. The glass A may afterward be turned back in the direction of the spoon-handle B. If it be intended to give a certain mixture of a medicine, the glass A may successively, one or more times, be filled with another medicine and then emptied into the basin of the spoon.

At the end of the spoon-handle is arranged a small dial-plate, on which two hands will indicate the hours when each giving of medicine has to take place.

The spoon may be made of metals which are inoffensive to health, and also of porcelain, glass, and caoutchouc.

What I claim as my invention, and desire to secure by Letters Patent, is—

A medicine-spoon consisting in the combination, with an indicating dial-plate provided on the spoon-handle, of a small measuring-glass arranged to turn by a hinge-joint on the spoon-handle.

In testimony whereof I have signed my name to this specification in the presence of two subscribing witnesses.

CARL DANIELOWSKY.

Witnesses:
 GEORGE MATTISON,
 JULIUS LINETAL.